(12) United States Patent
Homer et al.

(10) Patent No.: US 10,061,749 B2
(45) Date of Patent: Aug. 28, 2018

(54) SYSTEMS AND METHODS FOR CONTEXTUAL VOCABULARIES AND CUSTOMER SEGMENTATION

(71) Applicants: Ian Homer, Reading (GB); Matthew Diss, Basingstoke (GB)

(72) Inventors: Ian Homer, Reading (GB); Matthew Diss, Basingstoke (GB)

(73) Assignee: SDL Netherlands B.V., Amsterdam (NL)

(*) Notice: Subject to any disclaimer, the term of this patent is extended or adjusted under 35 U.S.C. 154(b) by 0 days.

(21) Appl. No.: 14/091,329

(22) Filed: Nov. 26, 2013

(65) Prior Publication Data
US 2015/0149885 A1 May 28, 2015

(51) Int. Cl.
G06F 17/00 (2006.01)
G06F 17/21 (2006.01)
G06F 17/30 (2006.01)
G06F 17/22 (2006.01)

(52) U.S. Cl.
CPC ........ G06F 17/211 (2013.01); G06F 17/2247 (2013.01); G06F 17/30893 (2013.01); G06F 17/30905 (2013.01)

(58) Field of Classification Search
CPC .................................................. G06F 17/3089
See application file for complete search history.

(56) References Cited

U.S. PATENT DOCUMENTS 4,845,658 A 7/1989 Gifford
4,916,614 A 4/1990 Kaji
4,920,499 A 4/1990 Skeirik
5,075,850 A 12/1991 Asahioka et al.
5,295,068 A 3/1994 Nishino et al.
5,351,189 A 9/1994 Doi
5,418,717 A 5/1995 Su et al.
(Continued)

FOREIGN PATENT DOCUMENTS

AU 5240198A A 5/1998
AU 694367 B2 7/1998
(Continued)

OTHER PUBLICATIONS

Wikipedia; "Serialization"; Nov. 14, 2013; 10 pages; https://web.archive.org/web/20131114152415/http://en.wikipedia.org/wiki/Serialization.*

(Continued)

Primary Examiner — Scott Baderman
Assistant Examiner — Benjamin J Smith
(74) Attorney, Agent, or Firm — Carr & Ferrell LLP

(57) ABSTRACT

Contextual vocabulary and methods of use are provided herein. A method may include obtaining contextual properties for a plurality of end users and device related information for computing devices used by the plurality of end users, the contextual information being obtained from a plurality of ambient information sources, including selection from a plurality of contextual repositories. Also, the method includes calculating a trust level for each of the plurality of customer analytic information sources and each of the plurality of device information databases, and building a contextual vocabulary from the contextual information and the device related information selected based upon their trust levels.

14 Claims, 7 Drawing Sheets

(56) References Cited

U.S. PATENT DOCUMENTS

| | | | |
|---|---|---|---|
| 5,477,451 A * | 12/1995 | Brown | G06F 17/2755 704/2 |
| 5,497,319 A | 3/1996 | Chong et al. | |
| 5,640,575 A | 6/1997 | Maruyama | |
| 5,644,775 A | 7/1997 | Thompson et al. | |
| 5,675,802 A | 10/1997 | Allen et al. | |
| 5,708,780 A | 1/1998 | Levergood et al. | |
| 5,715,314 A | 2/1998 | Payne et al. | |
| 5,724,424 A | 3/1998 | Gifford | |
| 5,751,957 A | 5/1998 | Hiroya et al. | |
| 5,774,868 A | 6/1998 | Cragun et al. | |
| 5,812,776 A | 9/1998 | Gifford | |
| 5,813,007 A | 9/1998 | Nielsen | |
| 5,873,056 A | 2/1999 | Liddy | |
| 5,884,097 A | 3/1999 | Li et al. | |
| 5,884,246 A | 3/1999 | Boucher et al. | |
| 5,894,554 A | 4/1999 | Lowery et al. | |
| 5,895,446 A | 4/1999 | Takeda et al. | |
| 5,909,492 A | 6/1999 | Payne et al. | |
| 5,966,685 A | 10/1999 | Flanagan et al. | |
| 5,974,372 A | 10/1999 | Barnes | |
| 5,978,828 A | 11/1999 | Greer et al. | |
| 5,987,401 A | 11/1999 | Trudeau | |
| 5,987,402 A | 11/1999 | Murata et al. | |
| 6,026,413 A | 2/2000 | Challenger et al. | |
| 6,041,333 A | 3/2000 | Bretschneider et al. | |
| 6,041,360 A | 3/2000 | Himmel et al. | |
| 6,044,344 A | 3/2000 | Kanevsky | |
| 6,049,785 A | 4/2000 | Gifford | |
| 6,085,162 A | 7/2000 | Cherny | |
| 6,092,035 A | 7/2000 | Kurachi et al. | |
| 6,108,703 A | 8/2000 | Leighton et al. | |
| 6,122,666 A | 9/2000 | Beurket et al. | |
| 6,128,652 A | 10/2000 | Toh et al. | |
| 6,128,655 A | 10/2000 | Fields et al. | |
| 6,161,082 A | 12/2000 | Goldberg et al. | |
| 6,163,785 A | 12/2000 | Carbonell et al. | |
| 6,195,649 B1 | 2/2001 | Gifford | |
| 6,199,051 B1 | 3/2001 | Gifford | |
| 6,205,437 B1 | 3/2001 | Gifford | |
| 6,212,634 B1 | 4/2001 | Geer et al. | |
| 6,216,212 B1 | 4/2001 | Challenger et al. | |
| 6,219,818 B1 | 4/2001 | Freivald et al. | |
| 6,256,712 B1 | 7/2001 | Challenger et al. | |
| 6,263,332 B1 | 7/2001 | Nasr et al. | |
| 6,278,969 B1 | 8/2001 | King et al. | |
| 6,279,112 B1 | 8/2001 | O'toole, Jr. et al. | |
| 6,330,566 B1 | 12/2001 | Durham | |
| 6,330,598 B1 | 12/2001 | Beckwith et al. | |
| 6,338,033 B1 | 1/2002 | Bourbonnais et al. | |
| 6,347,316 B1 | 2/2002 | Redpath | |
| 6,356,865 B1 | 3/2002 | Franz et al. | |
| 6,356,903 B1 | 3/2002 | Baxter et al. | |
| 6,363,337 B1 | 3/2002 | Amith | |
| 6,401,105 B1 | 6/2002 | Carlin et al. | |
| 6,415,257 B1 | 7/2002 | Junqua | |
| 6,438,540 B2 | 8/2002 | Nasr et al. | |
| 6,449,599 B1 | 9/2002 | Payne et al. | |
| 6,477,524 B1 | 11/2002 | Taskiran | |
| 6,477,575 B1 | 11/2002 | Koeppel et al. | |
| 6,490,358 B1 | 12/2002 | Geer et al. | |
| 6,490,563 B2 | 12/2002 | Hon | |
| 6,526,426 B1 | 2/2003 | Lakritz | |
| 6,581,061 B2 | 6/2003 | Graham | |
| 6,623,529 B1 | 9/2003 | Lakritz | |
| 6,658,627 B1 | 12/2003 | Gallup | |
| 6,725,333 B1 | 4/2004 | Degenaro et al. | |
| 6,748,569 B1 | 6/2004 | Brooke et al. | |
| 6,782,384 B2 | 8/2004 | Sloan et al. | |
| 6,865,528 B1 | 3/2005 | Huang | |
| 6,920,419 B2 | 7/2005 | Kitamura | |
| 6,973,656 B1 | 12/2005 | Huynh et al. | |
| 6,976,207 B1 | 12/2005 | Rujan | |
| 6,990,439 B2 | 1/2006 | Xun | |
| 7,013,264 B2 | 3/2006 | Dolan | |
| 7,031,908 B1 | 4/2006 | Huang | |
| 7,050,964 B2 | 5/2006 | Menzes | |
| 7,089,493 B2 | 8/2006 | Hatori et al. | |
| 7,111,229 B2 | 9/2006 | Nicholas et al. | |
| 7,124,092 B2 | 10/2006 | O'Toole, Jr. et al. | |
| 7,177,792 B2 | 2/2007 | Knight | |
| 7,191,447 B1 | 3/2007 | Ellis et al. | |
| 7,207,005 B2 | 4/2007 | Laktritz | |
| 7,209,875 B2 | 4/2007 | Quirk | |
| 7,249,013 B2 | 7/2007 | Al-Onaizan | |
| 7,249,314 B2 | 7/2007 | Walker et al. | |
| 7,272,639 B1 | 9/2007 | Levergood et al. | |
| 7,295,962 B2 | 11/2007 | Marcu | |
| 7,295,963 B2 | 11/2007 | Richardson et al. | |
| 7,302,429 B1 | 11/2007 | Wanker | |
| 7,333,927 B2 | 2/2008 | Lee | |
| 7,340,388 B2 | 3/2008 | Soricut | |
| 7,353,165 B2 | 4/2008 | Zhou | |
| 7,369,984 B2 | 5/2008 | Fairweather | |
| 7,383,320 B1 | 6/2008 | Silberstein et al. | |
| 7,389,222 B1 | 6/2008 | Langmead | |
| 7,389,223 B2 | 6/2008 | Atkin | |
| 7,448,040 B2 | 11/2008 | Ellis et al. | |
| 7,454,326 B2 | 11/2008 | Marcu | |
| 7,509,313 B2 | 3/2009 | Colledge | |
| 7,516,062 B2 | 4/2009 | Chen et al. | |
| 7,533,013 B2 | 5/2009 | Marcu | |
| 7,606,814 B2 | 10/2009 | Deily et al. | |
| 7,620,538 B2 | 11/2009 | Marcu | |
| 7,620,549 B2 | 11/2009 | Di Cristo | |
| 7,624,005 B2 | 11/2009 | Koehn | |
| 7,668,782 B1 | 2/2010 | Reistad et al. | |
| 7,680,647 B2 | 3/2010 | Moore | |
| 7,698,126 B2 * | 4/2010 | Kohlmeier | G06F 9/454 704/8 |
| 7,716,037 B2 | 5/2010 | Precoda | |
| 7,734,459 B2 | 6/2010 | Menezes | |
| 7,739,102 B2 | 6/2010 | Bender | |
| 7,739,286 B2 | 6/2010 | Sethy | |
| 7,788,087 B2 | 8/2010 | Corston-Oliver | |
| 7,813,918 B2 | 10/2010 | Muslea | |
| 7,836,057 B1 | 11/2010 | Micaelian et al. | |
| 7,865,358 B2 | 1/2011 | Green | |
| 7,904,595 B2 | 3/2011 | Cheng et al. | |
| 7,925,493 B2 | 4/2011 | Watanabe | |
| 7,945,437 B2 | 5/2011 | Mount et al. | |
| 7,949,633 B1 | 5/2011 | Shaver et al. | |
| 7,958,453 B1 | 6/2011 | Taing | |
| 7,983,896 B2 | 7/2011 | Ross | |
| 7,983,897 B2 | 7/2011 | Chin | |
| 8,015,222 B2 | 9/2011 | Abnous et al. | |
| 8,078,450 B2 | 12/2011 | Anisimovich et al. | |
| 8,135,575 B1 | 3/2012 | Dean | |
| 8,185,830 B2 * | 5/2012 | Saha | G06F 17/3089 715/741 |
| 8,195,447 B2 | 6/2012 | Anismovich | |
| 8,214,196 B2 | 7/2012 | Yamada | |
| 8,239,186 B2 | 8/2012 | Chin | |
| 8,239,207 B2 | 8/2012 | Seligman | |
| 8,260,846 B2 | 9/2012 | Lahav | |
| 8,286,185 B2 | 10/2012 | Ellis et al. | |
| 8,296,127 B2 | 10/2012 | Marcu | |
| 8,296,463 B2 | 10/2012 | Cheng et al. | |
| 8,352,244 B2 | 1/2013 | Gao et al. | |
| 8,364,463 B2 | 1/2013 | Miyamoto | |
| 8,386,234 B2 | 2/2013 | Uchimoto et al. | |
| 8,413,045 B2 * | 4/2013 | Lemonik | G06F 17/2247 715/234 |
| 8,423,346 B2 | 4/2013 | Seo et al. | |
| 8,442,812 B2 | 5/2013 | Ehsani | |
| 8,453,052 B1 | 5/2013 | Newman et al. | |
| 8,489,980 B2 * | 7/2013 | Lakritz | G06F 15/00 704/2 |
| 8,521,506 B2 | 8/2013 | Lancaster et al. | |
| 8,527,260 B2 | 9/2013 | Best | |
| 8,548,794 B2 | 10/2013 | Koehn | |
| 8,554,591 B2 | 10/2013 | Reistad et al. | |
| 8,594,992 B2 | 11/2013 | Kuhn et al. | |
| 8,600,728 B2 | 12/2013 | Knight | |

(56) References Cited

U.S. PATENT DOCUMENTS

| | | |
|---|---|---|
| 8,606,900 B1 | 12/2013 | Levergood et al. |
| 8,612,203 B2 | 12/2013 | Foster |
| 8,615,388 B2 | 12/2013 | Li |
| 8,635,327 B1 | 1/2014 | Levergood et al. |
| 8,635,539 B2 | 1/2014 | Young |
| 8,666,725 B2 | 3/2014 | Och |
| 8,671,214 B2 * | 3/2014 | Lockhart .......... G06F 17/30017 709/206 |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,799,200 B2 | 8/2014 | Lahav |
| 8,818,790 B2 | 8/2014 | He et al. |
| 8,843,359 B2 | 9/2014 | Lauder |
| 8,862,456 B2 | 10/2014 | Krack et al. |
| 8,898,052 B2 | 11/2014 | Waibel |
| 8,903,707 B2 | 12/2014 | Zhao |
| 8,909,683 B1 | 12/2014 | Ledet |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,954,539 B2 | 2/2015 | Lahav |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,336,487 B2 | 5/2016 | Lahav |
| 9,369,489 B2 * | 6/2016 | Kato .................. H04L 63/20 |
| 9,396,184 B2 | 7/2016 | Roy |
| 9,396,436 B2 | 7/2016 | Lahav |
| 9,430,449 B2 | 8/2016 | Leblond et al. |
| 9,465,797 B2 | 10/2016 | Ji |
| 9,471,563 B2 | 10/2016 | Trese |
| 9,519,640 B2 | 12/2016 | Perez |
| 9,547,626 B2 | 1/2017 | de Voogd |
| 9,552,355 B2 | 1/2017 | Dymetman |
| 9,596,188 B2 | 3/2017 | Cheng et al. |
| 9,600,473 B2 | 3/2017 | Leydon |
| 9,613,026 B2 | 4/2017 | Hodson |
| 9,773,270 B2 | 9/2017 | Costa et al. |
| 9,781,050 B2 | 10/2017 | Cheng et al. |
| 9,954,794 B2 | 4/2018 | Cheng et al. |
| 2001/0029507 A1 | 10/2001 | Nojima |
| 2002/0007383 A1 | 1/2002 | Yoden et al. |
| 2002/0023101 A1 | 2/2002 | Kurihara et al. |
| 2002/0046018 A1 | 4/2002 | Marcu |
| 2002/0065848 A1 | 5/2002 | Walker et al. |
| 2002/0083103 A1 | 6/2002 | Ballance |
| 2002/0103698 A1 | 8/2002 | Cantrell |
| 2002/0120762 A1 | 8/2002 | Cheng et al. |
| 2002/0124109 A1 | 9/2002 | Brown |
| 2002/0178166 A1 | 11/2002 | Hsia |
| 2003/0009320 A1 | 1/2003 | Furuta |
| 2003/0023757 A1 | 1/2003 | Ishioka et al. |
| 2003/0163346 A1 | 8/2003 | Tinti et al. |
| 2003/0200094 A1 | 10/2003 | Gupta |
| 2004/0010496 A1 | 1/2004 | Behrendt et al. |
| 2004/0019849 A1 | 1/2004 | Weng et al. |
| 2004/0034520 A1 | 2/2004 | Langkilde-Geary |
| 2004/0039593 A1 | 2/2004 | Eskandari |
| 2004/0044517 A1 | 3/2004 | Palmquist |
| 2004/0044576 A1 | 3/2004 | Kurihara et al. |
| 2004/0148409 A1 | 7/2004 | Davis et al. |
| 2004/0187090 A1 | 9/2004 | Meacham |
| 2004/0255281 A1 | 12/2004 | Imamura et al. |
| 2005/0039116 A1 | 2/2005 | Slack-Smith |
| 2005/0086105 A1 | 4/2005 | McFadden et al. |
| 2005/0156714 A1 | 7/2005 | McCarthy et al. |
| 2005/0171944 A1 | 8/2005 | Palmquist |
| 2005/0189415 A1 | 9/2005 | Fano et al. |
| 2005/0228865 A1 * | 10/2005 | Hirsch .................. H04L 67/02 709/206 |
| 2005/0235351 A1 * | 10/2005 | Seltzer .................. G06F 21/36 726/14 |
| 2005/0246283 A1 | 11/2005 | Gwiazda et al. |
| 2006/0041558 A1 | 2/2006 | McCauley et al. |
| 2006/0053367 A1 | 3/2006 | Chen et al. |
| 2006/0080257 A1 | 4/2006 | Vaughan et al. |
| 2006/0080265 A1 | 4/2006 | Hinds et al. |
| 2006/0080397 A1 | 4/2006 | Chene et al. |
| 2006/0095526 A1 | 5/2006 | Levergood et al. |
| 2006/0178918 A1 | 8/2006 | Mikurak |
| 2006/0248442 A1 | 11/2006 | Rosenstein et al. |
| 2006/0282255 A1 | 12/2006 | Lu |
| 2007/0016363 A1 | 1/2007 | Huang |
| 2007/0022003 A1 | 1/2007 | Chao et al. |
| 2007/0033104 A1 | 2/2007 | Collins et al. |
| 2007/0043553 A1 | 2/2007 | Dolan |
| 2007/0047781 A1 | 3/2007 | Hull et al. |
| 2007/0048714 A1 | 3/2007 | Plastina et al. |
| 2007/0083425 A1 | 4/2007 | Cousineau et al. |
| 2007/0112553 A1 | 5/2007 | Jacobson |
| 2007/0118545 A1 | 5/2007 | Chandrasekharan et al. |
| 2007/0208991 A1 | 9/2007 | Rider |
| 2007/0209005 A1 | 9/2007 | Shaver et al. |
| 2007/0226058 A1 | 9/2007 | Lorenzen et al. |
| 2007/0234213 A1 | 10/2007 | Krikorian et al. |
| 2008/0086298 A1 | 4/2008 | Anismovich |
| 2008/0109374 A1 | 5/2008 | Levergood et al. |
| 2008/0120120 A1 | 5/2008 | Cirulli et al. |
| 2008/0154577 A1 | 6/2008 | Kim |
| 2008/0195664 A1 * | 8/2008 | Maharajh .......... G06F 17/30035 |
| 2008/0201344 A1 | 8/2008 | Levergood et al. |
| 2008/0209320 A1 * | 8/2008 | Mawhinney ...... G06F 17/30905 715/700 |
| 2008/0244053 A1 | 10/2008 | Sampson et al. |
| 2008/0256235 A1 | 10/2008 | Sim et al. |
| 2008/0270398 A1 | 10/2008 | Landau et al. |
| 2008/0288240 A1 | 11/2008 | D'Agostini et al. |
| 2008/0316228 A1 * | 12/2008 | Seljavaara ........ G06F 17/30905 345/660 |
| 2009/0061764 A1 * | 3/2009 | Lockhart .......... G06F 17/30017 455/3.06 |
| 2009/0094017 A1 | 4/2009 | Chen et al. |
| 2009/0099931 A1 | 4/2009 | Aaltonen et al. |
| 2009/0138458 A1 | 5/2009 | Wanker |
| 2009/0197580 A1 | 8/2009 | Gupta et al. |
| 2009/0217196 A1 | 8/2009 | Neff et al. |
| 2009/0217352 A1 | 8/2009 | Shen et al. |
| 2009/0234711 A1 | 9/2009 | Ramer et al. |
| 2009/0240539 A1 | 9/2009 | Slawson |
| 2009/0248801 A1 | 10/2009 | Then et al. |
| 2009/0259684 A1 | 10/2009 | Knight et al. |
| 2009/0313005 A1 | 12/2009 | Jaquinta |
| 2009/0313245 A1 | 12/2009 | Weyl et al. |
| 2010/0023475 A1 | 1/2010 | Lahav |
| 2010/0023581 A1 | 1/2010 | Lahav |
| 2010/0057439 A1 | 3/2010 | Ideuchi et al. |
| 2010/0057561 A1 | 3/2010 | Gifford |
| 2010/0070364 A1 | 3/2010 | Dugan |
| 2010/0070843 A1 | 3/2010 | Duym |
| 2010/0121630 A1 | 5/2010 | Mende et al. |
| 2010/0153404 A1 * | 6/2010 | Ghosh ............... G06F 17/30699 707/748 |
| 2010/0179803 A1 | 7/2010 | Sawaf |
| 2010/0211865 A1 | 8/2010 | Fanning et al. |
| 2010/0233996 A1 * | 9/2010 | Herz .................... H04L 63/08 455/411 |
| 2010/0242069 A1 | 9/2010 | Jung et al. |
| 2010/0257457 A1 | 10/2010 | De Goes |
| 2010/0274661 A1 | 10/2010 | Aaltonen et al. |
| 2010/0281008 A1 | 11/2010 | Braunwarth |
| 2010/0312619 A1 | 12/2010 | Ala-Pietila et al. |
| 2011/0010243 A1 | 1/2011 | Wilburn et al. |
| 2011/0047468 A1 | 2/2011 | Ishizaka |

(56) References Cited

U.S. PATENT DOCUMENTS

| | | |
|---|---|---|
| 2011/0060998 A1 | 3/2011 | Schwartz et al. |
| 2011/0066469 A1 | 3/2011 | Kadosh |
| 2011/0078626 A1 | 3/2011 | Bachman et al. |
| 2011/0097693 A1 | 4/2011 | Crawford |
| 2011/0191458 A1 | 8/2011 | Cheng et al. |
| 2011/0264736 A1 | 10/2011 | Zuckerberg et al. |
| 2011/0270975 A1 | 11/2011 | Troup |
| 2012/0022852 A1 | 1/2012 | Tregaskis |
| 2012/0023129 A1 | 1/2012 | Vedula et al. |
| 2012/0096366 A1 | 4/2012 | Narla et al. |
| 2012/0131441 A1 | 5/2012 | Jitkoff et al. |
| 2012/0136718 A1 | 5/2012 | Katti |
| 2012/0143816 A1* | 6/2012 | Zhang ............... G06F 17/30867 707/607 |
| 2012/0185759 A1* | 7/2012 | Balinsky ............ G06F 21/6227 715/209 |
| 2012/0197718 A1 | 8/2012 | Martchenko et al. |
| 2012/0197770 A1 | 8/2012 | Raheja et al. |
| 2012/0197957 A1 | 8/2012 | de Voogd |
| 2012/0203861 A1* | 8/2012 | Flack ..................... G06Q 10/10 709/217 |
| 2012/0221407 A1 | 8/2012 | Erasmus et al. |
| 2012/0233665 A1* | 9/2012 | Ranganathan .......... G06F 21/33 726/4 |
| 2012/0266076 A1* | 10/2012 | Lockhart ........... G06F 17/30017 715/738 |
| 2012/0330990 A1 | 12/2012 | Chen et al. |
| 2013/0031470 A1* | 1/2013 | Daly, Jr. ............ G06F 17/30867 715/243 |
| 2013/0036202 A1 | 2/2013 | Lahav |
| 2013/0067055 A1 | 3/2013 | Cheng et al. |
| 2013/0091014 A1 | 4/2013 | Kellogg |
| 2013/0097488 A1 | 4/2013 | Coman et al. |
| 2013/0124987 A1* | 5/2013 | Lakritz ................. G06F 17/289 715/264 |
| 2013/0144566 A1 | 6/2013 | De Biswas |
| 2013/0151940 A1* | 6/2013 | Bailor ..................... G06F 17/24 715/229 |
| 2013/0173247 A1 | 7/2013 | Hodson |
| 2013/0262986 A1 | 10/2013 | Leblond et al. |
| 2013/0304607 A1 | 11/2013 | Costa et al. |
| 2013/0325442 A1 | 12/2013 | Dahlmeier |
| 2013/0326345 A1 | 12/2013 | Haggart et al. |
| 2014/0019625 A1 | 1/2014 | Cheng et al. |
| 2014/0058718 A1 | 2/2014 | Kunchukuttan |
| 2014/0081775 A1 | 3/2014 | Leblond et al. |
| 2014/0082032 A1 | 3/2014 | Leblond et al. |
| 2014/0087760 A1 | 3/2014 | Bennett |
| 2014/0142917 A1 | 5/2014 | D'Penha |
| 2014/0142918 A1 | 5/2014 | Dotterer |
| 2014/0173414 A1* | 6/2014 | Chan ................... G06F 17/3089 715/234 |
| 2014/0181013 A1 | 6/2014 | Micucci et al. |
| 2014/0229257 A1 | 8/2014 | Reistad et al. |
| 2014/0250369 A1 | 9/2014 | Mitnick et al. |
| 2014/0297252 A1 | 10/2014 | Prasad et al. |
| 2014/0298483 A1* | 10/2014 | Kato ....................... H04L 63/10 726/27 |
| 2014/0304080 A1 | 10/2014 | Yilmaz |
| 2014/0310229 A1 | 10/2014 | Lahav |
| 2014/0351053 A1 | 11/2014 | Link |
| 2014/0358519 A1 | 12/2014 | Mirkin |
| 2014/0358524 A1 | 12/2014 | Papula |
| 2014/0365201 A1 | 12/2014 | Gao |
| 2015/0040000 A1* | 2/2015 | Rice ..................... G06F 17/2247 715/235 |
| 2015/0051896 A1 | 2/2015 | Simard |
| 2015/0074518 A1* | 3/2015 | Rumsey ............... G06F 17/248 715/235 |
| 2015/0149886 A1 | 5/2015 | Homer et al. |
| 2015/0186362 A1 | 7/2015 | Li |
| 2015/0188961 A1 | 7/2015 | Ricci |
| 2015/0213363 A1 | 7/2015 | Lahav |
| 2015/0310504 A1 | 10/2015 | Potter |
| 2017/0124069 A1 | 5/2017 | Bondarchuk et al. |
| 2017/0149683 A1 | 5/2017 | Cheng et al. |
| 2017/0337614 A1 | 11/2017 | Costa et al. |

FOREIGN PATENT DOCUMENTS

| | | |
|---|---|---|
| AU | 5202299A A | 10/1999 |
| CA | 2221506 A1 | 12/1996 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| EP | 0830774 A2 | 3/1998 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235177 A2 | 8/2002 |
| EP | 0734556 B1 | 9/2002 |
| EP | 0830774 B1 | 10/2004 |
| EP | 1489523 A2 | 12/2004 |
| EP | 1170680 | 8/2005 |
| EP | 2299369 A1 | 3/2011 |
| EP | 2668599 | 12/2013 |
| EP | 2668626 | 12/2013 |
| EP | 2678814 | 1/2014 |
| EP | 2896007 | 7/2015 |
| EP | 2896008 | 7/2015 |
| GB | 2241359 A | 8/1991 |
| JP | H10509543 A | 9/1998 |
| JP | H11507752 A | 7/1999 |
| JP | 2001117847 A | 4/2001 |
| JP | 2001136583 A | 5/2001 |
| JP | 3190881 B2 | 7/2001 |
| JP | 3190882 B2 | 7/2001 |
| JP | 2001188992 A | 7/2001 |
| JP | 2001350790 A | 12/2001 |
| JP | 3260693 B2 | 2/2002 |
| JP | 2002073677 A | 3/2002 |
| JP | 2002132822 A | 5/2002 |
| JP | 3367675 B2 | 1/2003 |
| JP | 2003032660 A | 1/2003 |
| JP | 2003157402 A | 5/2003 |
| JP | 2004538542 A | 12/2004 |
| JP | 2005056080 A | 3/2005 |
| JP | 2005267535 A | 9/2005 |
| JP | 3762882 B2 | 4/2006 |
| JP | 2006216073 A | 8/2006 |
| JP | 2006260329 A | 9/2006 |
| JP | 2007042127 A | 2/2007 |
| JP | 2008027265 A | 2/2008 |
| JP | 2009020845 A | 1/2009 |
| JP | 2009518761 A | 5/2009 |
| JP | 2009301480 A | 12/2009 |
| JP | 4485548 B2 | 6/2010 |
| JP | 2010152588 A | 7/2010 |
| JP | 2011002905 A | 1/2011 |
| JP | 4669373 B2 | 4/2011 |
| JP | 4669430 B2 | 4/2011 |
| JP | 2005174120 A | 6/2015 |
| JP | 5952307 | 7/2016 |
| JP | 5952312 | 7/2016 |
| JP | 6138054 B2 | 6/2017 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO20030081441 | 2/2003 |
| WO | WO2007068123 A1 | 6/2007 |
| WO | WO20070118424 A1 | 10/2007 |
| WO | WO2010062540 A1 | 6/2010 |
| WO | WO2010062542 A1 | 6/2010 |
| WO | WO2012101240 | 8/2012 |
| WO | WO2012101243 | 8/2012 |

(56) References Cited

FOREIGN PATENT DOCUMENTS

| WO | WO2012113791 | 8/2012 |
|---|---|---|
| WO | WO2013144358 | 10/2013 |
| WO | WO2013167734 | 11/2013 |
| WO | WO2014041148 | 3/2014 |
| WO | WO2014041149 | 3/2014 |

OTHER PUBLICATIONS

Microsoft, MSDN; "Serialization .NET Framework 4.5"; Jan. 10, 2013; 2 pages; https://web.archive.org/web/20130110102559/http://msdn.microsoft.com/en-us/library/7ay27kt9(v=vs.110).aspx.*
"The GNU Make Manual", Version 3.79, edition 0.55, Apr. 2000, Free Software Foundation, Inc, pp. 1-8, 118, 128.
Rational Software Corporation, "Introduction to ClearCase", Dec. 1999, Rational ClearCase, Release 4.0, pp. i-xiv, 1, 2, 30, 33, 37, 40, 59.
Rational Software Corporation, "Administering ClearCase", Rational ClearCase Release 4.0, 1999, pp. i-xxx, 1-6, 129-162, 255-260, 278, 281, 283, 345-348.
Challenger et al., "A Scalable System for Consistently Caching Dynamic Web Data", INFOCOM '99. Eighteenth Annual Joint Conference of the IEEE Computer and Communications Societies. Proceedings. IEEE, Mar. 21-25, 1999, pp. 294-303, vol. 1, 10 pages.
Challenger et al., "A Publishing System for Efficiently Creating Dynamic Web Content", INFOCOM 2000. Nineteenth Annual Joint Conference of the IEEE Computer and Communications Societies. Proceedings. IEEE, Mar. 26-30 2000, vol. 2, pp. 1-7, 10.
Croll et al., "Content Management—The Users Requirements", International Broadcasting Convention, Conference Publication No. 447, Sep. 12-16, 1997, 4 pages.
IDIOM, Inc. "WorldServer 2 White Paper", 2000, 19 pages.
Market Wire. "VerticalNet Selects Uniscape As Globalization Provider to Speed Global Expansion", Jun. 2000, <www.findarticles.com/p/articles/mi_pwwi/is_200006/ai_mark01011558/print> accessed on Oct. 1, 2005, 2 pages.
PRNewsWire and News desk. "Personify Selects Uniscape to Enable Ebusiness Solutions for Global Markets", Aug. 30, 2000, <www.findwealth.com/personify-selects-uniscape-to-enable-180593pr.html> accessed on Oct. 1, 2005, 2 pages.
Uniscape, Inc. "Uniscape, Inc. Home Page", publicly posted Feb. 20, 1999, <web.archive.org/web/19990220195249//http://www.uniscape-inc.com/> accessed on Oct. 1, 2005, 2 pages.
Business Wire. "Uniscape Introduces Pilot Program to Provide Multilingual Website Management Solutions," Feb. 11, 1999, <www.findarticles.com/p/articles/mi_m0EIN/is_1999_Feb_11/11/ai_53852378> accessed on May 9, 2011, 1 page.
Business Wire. "Uniscape Announces New Solution for Automating Management of Software Localization Process," Aug. 17, 1998, <www.findarticles.com/p/articles/mi_m0EIN/is_1998_August_17/ai_21090247> accessed on Sep. 30, 2005, 2 pages.
Market Wire. "Cephren Relies on Uniscape During Rapid Global eBusiness Expansion," Oct. 18, 2000, <www.marketwire.com/mw/iwpr?id=18115&cat=te> accessed on Oct. 1, 2005, 2 pages.
My Yahoo—RSS Headlines Module—Frequently Asked Questions. XP002508567. Dec. 17, 2008.
"Krishnan, ""Unmittelbare Ergenbnisse Noch Schneller: Google Vorschau—Der Google Produkt-Kompass,""Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages."
Unidex, Inc.: "XML Convert," Aug. 4, 2007, <http://www.unidex.com/xflat.htm> accessed on Apr. 5, 2012, 1 page.
Wikipedia—"SOAP," Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.

XP007905525, The Technical Aspects Identified in the Present Application (Art. 15 PCT) are considered part of common general knowledge. Due to their notoriety no. documentary evidence is found to be required. Official Journal Nov. 2007, p. 592.
International Search Report and Written Opinion dated Apr. 26, 2012 in application No. PCT/EP2012/051284, filed Jan. 27, 2012.
International Search Report and Written Opinion dated May 15, 2012 in application No. PCT/EP2012/052934, filed Feb. 21, 2012.
International Search Report and Written Opinion dated May 2, 2012 in application No. PCT/EP2012/051291, filed Jan. 27, 2012.
International Search Report and Written Opinion dated Oct. 23, 2013 in Patent Cooperation Treaty application No. PCT/EP2013/056842, filed Mar. 29, 2013 pp. 1, 3-6, 8-10.
International Search Report and Written Opinion dated Jan. 8, 2014 in Patent Cooperation Treaty application No. PCT/EP2013/069078, filed Sep. 14, 2013 pp. 1, 3-7.
International Search Report and Written Opinion dated Jan. 8, 2014 in Patent Cooperation Treaty application No. PCT/EP2013/069077, filed Sep. 14, 2013 pp. 1, 3, 4, 6-8.
Colligan et al.; Special Edition Using Microsoft Office FrontPage 2003; 2004; Que Publishing; pp. 50-91 and 323-326.
"Highlight," Microsoft Computer Dictionary; May 1, 2002; Microsoft Press; p. 320.
First Examination Report dated Jun. 17, 2014 in European Patent Convention application No. 12707723.8, filed Feb. 21, 2012, pp. 1, 3-6.
Summons to Attend Oral Proceedings dated Feb. 11, 2015 in European Patent Convention application No. 1270772.8, filed Feb. 21, 2012.
"Inheritance (object-oriented programming)", archived Wikipedia on Sep. 4, 2011, http://en.wikipedia.org/w/index.php?title=Inheritance_(object-oriented_programming)&oldid=448382925.
Result of Consultation dated May 28, 2015 in European Patent Convention application No. 12707723.8, filed Feb. 21, 2012, pp. 1-3.
Decision to Refuse dated Jun. 29, 2015 in European Patent Application 12707723.8 filed Feb. 21, 2012, pp. 1-30.
The Minutes of Oral Proceeding dated Jun. 29, 2015 in European Patent Application 12707723.8 filed Feb. 21, 2012, pp. 1-8.
Preview; Feb. 26, 2011; Dictionary.com; pp. 1-2.
Edgar; "Why Do Browsers Display My Site Differently?" Jun. 3, 2009 (updated Nov. 2010); matthewedgar.net; pp. 1-5.
Japan Patent Application No. 2013-550887, "Office Action," dated Oct. 4, 2016, 4 pages [8 pages including translation].
European Patent Application No. 12703482.5, "Office Action," dated Sep. 6, 2016, 4 pages.
Office Action dated Jan. 5, 2016 in Japanese Patent Application 2013-550887 filed Jul. 26, 2013, pp. 1-20.
Office Action dated Dec. 22, 2015 in Japanese Patent Application 2013-550888 filed Jan. 27, 2012, pp. 1-20.
Notice of Allowance dated May 24, 2016 in Japanese Patent Application 2013-550888 filed Jan. 27, 2012, pp. 1-3.
Notice of Allowance dated May 24, 2016 in Japanese Patent Application 2013-554869 filed Feb. 21, 2012, pp. 1-3.
Office Action dated Feb. 9, 2016 in Japanese Patent Application 2013-554869 filed Feb. 21, 2012, pp. 1-4.
Schafer, Ben J. et al., "Recommender Systems in E-Commerce," Proceedings of the 1st ACM conference on Electronic Commerce (EC '99), ACM, New York, NY, 1999, pp. 158-166.
European Patent Application No. 12703483.3, "Office Action," Jan. 25, 2017, 7 pages.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.

(56) References Cited

OTHER PUBLICATIONS

Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machines-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. " Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.
Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.
Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation.
Langlois et al. "LORIA System for the WMT12 Quality Estimation Shared Task" [W12-3113] Proceedings of the Seventh Workshop an Statistical Machine Translation, Jun. 7, 2012, pp. 114-119. Retrieved from: http://aclanthology.info/volumes/proceedings-of-the-seventh-workshop-onstatistical-machine-translation.
Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.
Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.
Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet<https://lilt.com/kb/translators/best-practices>, 2 pages.
"Data Security—Knowledge Base," Lilt website [online], Oct. 14, 2016 [retrieved on Oct. 19, 2017], Retrieved from the Internet<https://lilt.com/kb/security>, 1 pages.
"Data Security and Confidentiality," Lilt website [online], 2017 [retrieved on Oct. 19, 2017], Retrieved from the Internet: <https://lilt.com/security>, 7 pages.
"Memories—Knowledge Base," Lilt website [online], Jun. 7, 2017 [retrieved on Oct. 19, 2017], Retrieved from the Internet<https://lilt.com/kb/project-managers/memory>, 4 pages.
"Memories (API)—Knowledge Base," Lilt website [online], Jun. 2, 2017 [retrieved on Oct. 19, 2017], Retrieved from the Internet:<https://lilt.com/kb/api/memories>, 1 page.
"Quoting—Knowledge Base," Lilt website [online], Jun. 7, 2017 [retrieved on Oct. 19, 2017], Retrieved from the Internet: <https://lilt.com/kb/project-managers/quoting>, 4 pages.
"The Editor—Knowledge Base," Lilt website [online], Aug. 15, 2017 [retrieved on Oct. 19, 2017], Retrieved from the Internet<https://lilt.com/kb/translators/editor>, 5 pages.
"Training Lilt—Knowledge Base," Lilt website [online], Oct. 14, 2016 [retrieved on Oct. 20, 2017], Retrieved from the Internet<https://lilt.com/kb/troubleshooting/training-lilt>, 1 page.
"What is Lilt_—Knowledge Base," Lilt website [online],Dec. 15, 2016 [retrieved on Oct. 19, 2017], Retrieved from the Internet<https://lilt.com/kb/what-is-lilt>, 1 page.
"Getting Started—Knowledge Base," Lilt website [online], Apr. 11, 2017 [retrieved on Oct. 20, 2017], Retrieved from the Internet<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet<https://lilt.com/kb/api/simple-translation, 3 pages.
"Split and Merge—Knowledge Base," Lilt website [online], Oct. 14, 2016 [retrieved on Oct. 20, 2017], Retrieved from the Internet<https://lilt.com/kb/translators/split-merge>, 4 pages.
"Lilt API _ API Reference," Lilt website [online], retrieved on Oct. 20, 2017, Retrieved from the Internet<https://lilt.com/docs/api>, 53 pages.
"Automatic Translation Quality—Knowledge Base", Lilt website [online], Dec. 1, 2016, retrieved on Oct. 20, 2017, Retrieved from the Internet<https://lilt.com/kb/evaluation/evaluate-mt>, 4 pages.
"Projects—Knowledge Base,"Lilt website [online], Jun. 7, 2017, retrieved on Oct. 20, 2017, Retrieved from the Internet: <https://lilt.com/kb/project-managers/projects>, 3 pages.
"Getting Started with lilt," Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.
Hildebrand et al., "Adaptation of the Translation Model for Statistical Machine Translation based on Information Retrieval," Eamt 2005 Conference Proceedings, May 2005, pp. 133-142. Retrieved from https://www. researchgate.net/ publication/

(56) References Cited

OTHER PUBLICATIONS

228634956_Adaptation_of the_translation_model_forstatistical_machine_translation_based_on_informt.

Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://d1.acm.org/citation.cfm?id=1105589.

Sethy et al., "Building Topic Specific Language Models Fromwebdata Using Competitive Models," INTERSPEECH 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.

Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.

Business Wire, "Language Weaver Introduces User-Managed Customization Tool," Oct. 25, 2005, 3 pages. Retrieved from http:ProQuest.

Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.

Potet et al., "Preliminary Experiments on Using Users' Post-Editions to Enhance a SMT System," Proceedings of the European Association for Machine Translation (EAMT), May 2011, pp. 161-168. Retreived from Retrieved at http://www.mt-archive.info/EAMT-2011-Potet.pdf.

Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.

Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.

Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.

Levenberg et al."Stream-based Translation Models for Statistical Machine Translation" Human Language Technologies: The 2010 Annual Conference of the North American Chapter of the ACL, Dec. 31, 2010, pp. 394-402.

Lagarda et al. "Statistical Post-Editing of a Rule Based Machine Translation System" Proceedings of NAACL HLT 2009: Short Papers, Jun. 2009, pp. 217-220.

Ehara, "Rule Based Machine Translation Combined with Statistical Post Editor for Japanese to English Patent Translation," MT Summit XI, 2007, pp. 13-18.

Bechara et al. "Statistical Post-Editing for a Statistical MT System" Proceedings of the 13th Machine Translation Summit, 2011, pp. 308-315.

Hildebrand et al., "Adaption of the Translation Model Statistical Machine Translation based on Information Retrieval," EAMT 2005 Conference Proceedings, May 2005, pp. 133-142. Retrieved from http://www.researchgate.net/publication/228634956_Adaption_of_the_translation_model_for_statistical_machine_translation_based_on_information_retrieval.

"Office Action", Japanese Patent Application 2013-550887, dated Jan. 5, 2016, 10 pages [20 pages with translation].

"Office Action", Japanese Patent Application 2013-550888, dated Dec. 22, 2016, 4 pages [8 pages with translation].

"Examining Division Preliminary Opinion," European Patent Application No. 12703483.3, dated Apr. 30, 2018, 9 pages.

"Decision to Refuse," European Patent Application No. 12703483.3, dated Jun. 19, 2018, 24 pages.

"Minutes of Oral Proceeding", European Patent Application No. 12703483.3, dated Jun. 19, 2018, 4 pages.

\* cited by examiner

SYSTEMS AND METHODS FOR CONTEXTUAL VOCABULARIES AND CUSTOMER SEGMENTATION

CROSS REFERENCE TO RELATED APPLICATIONS

This U.S. Non-Provisional Patent Application is related to U.S. patent application Ser. No. 13/016,988, filed on Jan. 29, 2011, titled "SYSTEMS, METHODS, AND MEDIA FOR MANAGING AMBIENT ADAPTABILITY OF WEB APPLICATIONS AND WEB SERVICES", which is hereby incorporated by reference herein in its entirety, including all references cited therein

FIELD OF THE TECHNOLOGY

Embodiments of the disclosure relate to web content management and delivery. More specifically, but not by way of limitation, the present technology is directed to systems and methods that create and utilize contextual vocabularies that describe the preferences or demographics of end users as well as the capabilities of the devices they utilize. The contextual vocabularies are built using a plurality of information sources, and may be used to service a plurality of target systems, allowing the target systems to customize web content for the end users and/or their device capabilities.

BACKGROUND OF THE DISCLOSURE

Web content continues to grow and evolve in complexity and implementational diversity. Further, computing devices which access web content also continue to proliferate, creating diversity in device capabilities such as processing power and display attributes. For example, smartphones may be capable of rendering web content on a display that is much smaller than the display of a tablet. To effectively communicate with consumers that utilize various devices with vastly different capabilities, it is advantageous to tailor web content to the capabilities of various devices. Without such modifications, browser applications on many devices are required to display web content in a format that may not be desired by the web content authors.

SUMMARY OF THE DISCLOSURE

According to some embodiments, the present technology may be directed to a method for building a contextual vocabulary comprising: (a) obtaining contextual information for a plurality of end users and device related information for computing devices used by the plurality of end users, the contextual information being obtained from a plurality of customer analytic information sources, the device related information being obtained from a plurality of device information databases; (b) calculating a trust level for each of the plurality of customer analytic information sources and each of the plurality of device information databases; and (c) building a contextual vocabulary from the contextual information and the device related information selected based upon their trust levels, the contextual vocabulary defining capabilities of the computing devices and preferences of the end users, the contextual vocabulary being utilized to dynamically format web content for a web page.

According to other embodiments, the present technology may be directed to a system for building a contextual vocabulary, the system comprising: (a) a processor; and (b) a memory for storing logic that when executed by the processor causes the system to: (i) obtain contextual information for a plurality of end users and device related information for computing devices used by the plurality of end users, the contextual information being obtained from a plurality of customer analytic information sources, the device related information being obtained from a plurality of device information databases; (ii) calculate a trust level for each of the plurality of customer analytic information sources and each of the plurality of device information databases; and (iii) build a contextual vocabulary from the contextual information and the device related information selected based upon their trust levels, the contextual vocabulary defining capabilities of the computing devices and preferences of the end users, the contextual vocabulary being utilized to dynamically format web content for a web page.

In some embodiments, the present disclosure is directed to a method that comprises: (a) determining context properties, in accordance with a defined contextual vocabulary, from ambient information sources based upon their respective trust levels; (b) generating a contextual segment path for an end user during a interaction in an application; (c) transmitting the context segment path as a string to other sub-systems via local or remote API method calls; and (d) transmitting the context properties from the plurality of end users and plurality of devices to other sub-systems.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
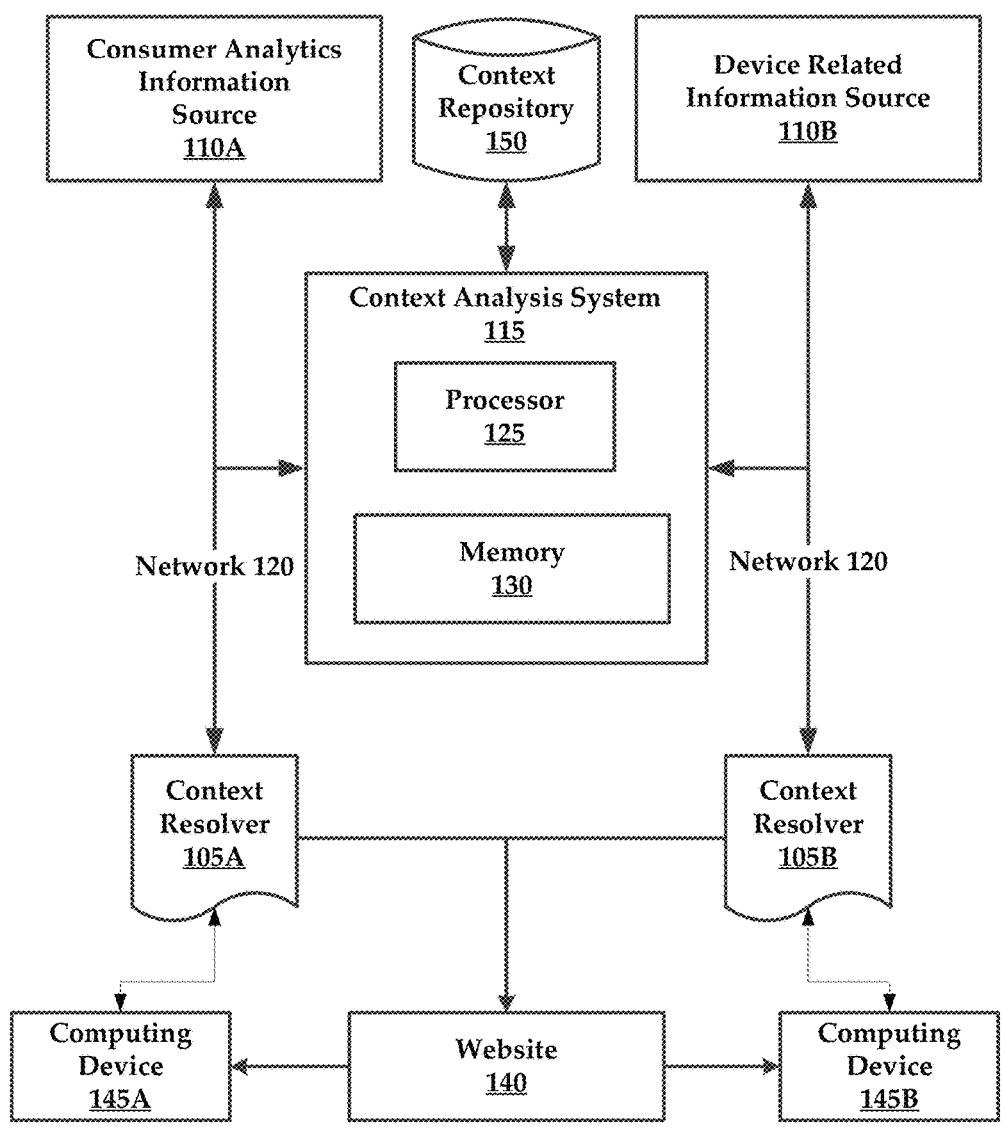
FIG. 1 is an exemplary computing architecture that may be used to practice aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

FIG. 1 is an exemplary computing architecture that may be used to practice aspects of the present technology. The architecture includes a plurality of context resolvers 105A-B that are each associated with individual information sources. Multiple context resolvers may be utilized to aggregate contextual intelligence from multiple sources.

For example, context resolver 105A may be associated with a consumer analytics information source 110A, while context resolver 105B may be associated with a device related information source 110B. It will be understood that the present technology may include many context resolvers and information sources. Further, a single context resolver may be used to obtain information or analytics from a plurality of information sources. While two context resolvers are illustrated, it will be understood that many context resolvers may be utilized in accordance with the present technology.

The context resolvers, such as 105A-B, may be included in a context analysis system 115, or may be separate nodes or agents that communicatively couple with the context analysis system 115 and the information sources over a network 120.

The context resolvers may be disposed between the context analysis system 115 and a web site 140. Examples of a plurality of context resolvers that can be utilized include, but are not limited to, resolvers that resolve context properties (e.g., contextual information) from customer databases, transactional databases, contextual information sources, context repositories, device discovery, expressions (evaluating expressions based on other properties), defaults (sensible defaults such that a given context property can never be not set), and other similar information sources.

In some embodiments, the context analysis system 115 may gather contextual information from ambient data sources that include ambient information. Ambient information is information that is observed from the continuous interactions between a plurality of users and a plurality of content and applications, along with a plurality of devices that the users use. This includes, but is not restricted to customer analytic information, content item properties consumed by users, and associated content metadata, contextual properties that are selected from a context repository (e.g., selection of relevant device properties from a device database), and information from users interactions with social networks—just to name a few.

According to some embodiments, contextual information obtained for the plurality of end users and the device related information obtained for the computing devices used by the plurality of end users may be stored by the context analysis system 115 in a context repository 150. Further, contextual segments and contextual segment paths, as described further herein, may also be stored in the context repository 150.

In some embodiments, the context analysis system 115 may be implemented as a cloud-based computing environment, such as a virtual machine operating within a computing cloud. In other embodiments, context analysis system 115 may itself include a cloud-based computing environment, where the functionalities of context analysis system 115 are executed in a distributed fashion. Thus, context analysis system 115, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the context analysis system 115, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

In some embodiments, the context analysis system 115 may include a server or other similar computing device that comprises at least a processor 125 and a memory 130. The memory 130 includes logic (e.g., executable instructions) that when executed by the processor causes the context analysis system 115 to perform the methods or processes described herein, which include, but are not limited to the creation and use of contextual vocabularies and context segment paths.

In general, a context segment is any boolean context property. A context segment path is an ordered list of segments that can be traversed to find the most appropriate resources. The path can be followed via a predetermined multiple fall-backs to find the first location where we find the desire resource. For the purpose of resource extension, where one resource may extend another, the path can be further followed to find the next relevant resource of the given name and so on.

Generally, a given segment can imply a plurality of other segments that are also automatically true, for example if a user is over 18 then they are also over 16, if a device is less than 120 pixels wide then it is also less than 640 pixels wide. This implies structure defines a multiple hierarchical structure that defines the order of the segment path that is traversed to find the most appropriate resources.

A serialized version of the context segment path is minimised by removing redundant inferred from the "implies" definition. For example "pc:640:320:128" Can be minimised to "pc:640" since 640 implies 320 which implies 128. For a given vocabulary definition the serialized version of the context segment path provides a complete definition of the applicable context segments, with implied segments determinable from the context vocabulary definition.

Expressions that are implied from the "implies" definitions are not evaluated at runtime and are automatically set to true to minimise computational overhead at runtime.

A given segment can define a plurality of other segments that this given segment depends on such that this plurality of other segments must all be true before the given segment is evaluated. Segments may be defined as "lazy" such that are only evaluated on demand, and in the case of "depends" being defined, to minimise computational overhead at runtime, the segment is not evaluated if the plurality of segments that the given segment depends on are all set.

Generally, the context analysis system 115 may be configured to create and utilize contextual vocabularies that can be shared amongst web content creation and delivery systems. A contextual vocabulary can be created by the context analysis system 115 by obtaining contextual intelligence or information from a plurality of information sources using the context resolvers 105A-B. In some embodiments, the information sources may include consumer analytical information gathered from user profiles created by customers, which would include any number of types of information such as usernames or handles, location information, language preferences, and a whole host of additional types of information that are indicative of the end user (e.g., customer).

The context analysis system 115 may also use consumer analytical information from transactional data, such as customer purchase history or browsing history. In other instances, consumer analytical information may be gathered from web browser information or by the collection of web analytics from websites that are visited by the end user.

These examples of consumer analytical information sources are merely a few of a vast number of consumer analytical information sources that would be known to one of ordinary skill in the art.

The present technology may also utilize device related information that is descriptive of the capabilities, properties, and/or attributes of a computing device used by an end user. Examples include, but are not limited to, processing attributes, software installed, input devices, display attributes, vendor & model, and as well as any other qualitative or quantitative attributes regard the computing device. The device information may be gathered by context resolvers 105A-B from available databases or client-side discovery or other similar information sources. Generally, the terms properties and capabilities with regard to a computing device may be used interchangeable herein.

Advantageously, the context analysis system 115 may obtain both consumer analytical information and device related information from a plurality of independent information sources. When considering information from a wide variety of sources, the context analysis system 115 may calculate a trust level for each of the information sources and selectively utilize only those information sources that are reputable. In some instances, the context analysis system 115 may aggregate information from a plurality of sources with or without the use of a trust level.

In some embodiments each context resolver 105A-B may apply trust levels to resolution on a per-property level (e.g., for each information source). Thus, a contextual vocabulary generated in light of these trust levels will reflect a property value with the highest trust levels for each named property. As used herein, the term "property" and "information source" may be used interchangeably.

Indeed, the context analysis system 115 may provide a trust-based distribution of context information that has been learned from and shared between multiple parties. Each piece of context information defines a provider of the information so that other nodes in the network can assign appropriate trust levels to the information provider, which is in turn imputed to the information obtained therefrom.

The contextual vocabulary is a collection of aspect definitions which in turn include a collection of property definitions that are defined by the context analysis system 115. The contextual vocabulary may include aggregated contextual properties in accordance with the context vocabulary that are comprised of information sources that are obtained from a wide variety of information sources.

The contextual properties may be generated by the context analysis system 115 from the aforementioned information sources. In some instances, the context vocabulary may comprise context segments that represent categorical attributes of end users or computing devices. For example, a categorical attribute of a user may include "under 30" or "high net worth" whereas a categorical attribute of a computing device may include "smartphone" or "retina display". In some instances, categorical attributes may be arranged hierarchically. For example, the "under 30" category is implicitly included in the category of "under 50". Thus, in some embodiments a context segment path may be generated from a multiple hierarchical representation of ordered context segments. For example, if a user is under 30 then it can be implied that they are under 40.

The context analysis system 115 can leverage granularity within these categories, creating more specific categories. These categories can be used to target specific promotions and advertisements to highly specific or broad groups of end users.

Some categorical attributes may include numerous dependent attributes. For example, the "smartphone" category may include a plurality of smartphone types that are determined from an analysis of device related information data sources. Thus, as end users interact with a website via diverse types of computing devices, the present technology may learn new types of smartphones that can be added to the smartphone category.

In some instances, categorical attributes may be shared amongst many types of devices. For example, many devices may use the same process or have the same display size or resolution.

In some instances, the inheritance of contextual segment information from a pre-defined contextual segment to another is defined by semantic property identifiers, thus a strict name-based hierarchy may not be required. This allows inheritance of contextual information to occur if such a semantically described contextual segment is pre-defined, although it will be understood that this contextual information may still be valid if the parent contextual segment did not exist. In some embodiments inheritance of contextual segments may occur on a per-aspect level. By way of non-limiting example, a browser-type inheritance is independent from device-type inheritance. For example, a computing device may utilize web browser client, but that web browser client is not necessarily indicative of the type of device (e.g., many devices may be configured with the web browser client).

As mentioned above, information included in a context segment may be dynamically adjusted by provision of new and/or more trusted contextual information.

In some embodiments, context segments are ordered such that a context segment can be assigned a higher precedence than another. This ordering of context segments by the context analysis system 115 may allow for optimal resource discovery, as will be described in greater detail below, where resource discovery is a process of determining which types of web content are most appropriate for the end user and their associated device.

Also, the context analysis system 115 may be configured to create context segment paths for end users. A context segment path may include a unique set of attributes that define the end user and their computing device. For example, the unique set of attributes may correspond to the contextual segments of the contextual vocabulary.

An example of a context segment path may include consumer analytics such as "under 30", "English language", and "U.K. resident", as well as a whole host of other analytics that may be determined from specific end user interactions with a website. For example, the end user may be browsing for travel related services for a specific date, or in connection with a particular event. This analytical knowledge may be combined with the more objective knowledge gained from, for example, a user profile or browser information.

The context analysis system 115 may calculate a context segment path for an end user by comparing the analytics of the end user (and their computing device) to the contextual vocabulary to determine applicable context segments for the end user. Again, the context segments are determined not only for the end user, but also the computing device used by the end user.

The context analysis system 115 may transmit the determined context segments that apply to the end user and their computing device to a website 140. The website 140 then tailors web content for a web page to the determined analytics. Web content may be tailored to the requirements of a plurality of users that utilize a plurality of computing devices 145A-B, where the web content that is provided to computing device 145A is different from the web content that is provided to computing device 145B. A detailed example of the delivery of tailored content is provided with respect to FIG. 2.

The following describes an exemplary use case of the present technology. An end user from the United States interacts with a web page that is tailored to travel related services. As the end user interacts with the website, the context analysis system 115 obtains web analytic information from both a user profile for the user, as well as web history information collected as the end user utilizes the website. Further, device related information can be obtained from a web browser executing on a computing device used by the end user. Also, device characteristics such as user agent, cookies, IP address and geographic coordinates may be passed to the website when the computing device initiates a session with the webserver. Using the IMEI, the context analysis system 115 may utilize context resolvers to obtain computing device related information.

The context analysis system 115 may compute a context segment path for the end user and their device as described above. When the context segment path is computed, the context analysis system 115 may compare the context segment path to context segments of a contextual vocabulary. Again, the contextual vocabulary includes an aggregation of trusted information that defines both consumers and computing devices. It will be understood that the trusted information includes information gathered from the information sources that were determined to have high trust levels.

The context analysis system 115 may utilize the trusted information to determine not only what type of web content is provided to the end user based upon their preferences or consumer segments, but also how the web content should be formatted for the computing device. For example, if the computing device has a small display and cannot display certain types of media, the context analysis system 115 may choose web content that is suitably displayed on the computing device. Also, the computing device analytics may specify that the device cannot easily or be rotated into a landscape position or scrolled. These types of device related information may aid the context analysis system 115 in selecting or tailoring offerings that are optimally displayed on the computing device.

Further, the web content may be tailored to the preferences or consumer segments of the end user. For example, the context analysis system 115 may determine that the end user is an affluent purchaser in the "under 30" category and that the end user has searched for travel related services to a particular location. Using all the above-described information, the context analysis system 115 may generate an offering for the end user that emphasizes a travel deal to the searched location, as well as hotel suggestions that include high-end properties. These offerings may be provided as a list that is easily and completely displayed on the computing device without any need for the end user to scroll for pertinent information.

Thus, from a given context segment path it is possible for the context analysis system 115 to reliably identify the most appropriate resources for a given context (e.g., best image, most appropriate HTML rendering, most appropriate advert, and so forth).

In some embodiments, a context segment path is embodied as a string that uniquely defines the context segment allocation for a given context, such as a browser or query session of an end user. The context segment path (with implicit segment inheritance) may include a minimized string that can be effectively be used as a cache key and reliably and efficiently serialized and de-serialized.

In some embodiments, the webserver that serves a website 140 that is configured to use the present technology may utilize web pages with HTML that is enhanced with attributes which can used to drive contextual rendering and optimization. These attributes may be executed by the web browser of the client device transparently such that they produce no noticeable side effects such as latency or erroneous web page renderings.

In some embodiments, the context analysis system 115 may utilize the contextual methods to optimize a web application delivery, for example optimization of images, rendering of most appropriate product recommendations, application of user customized themes, and so forth. The context analysis system 115 may choose at which stage the optimization can be applied. In some embodiments, the context analysis system 115 may optimize the web content when a request from an end user is received. In other instances, the context analysis system 115 may optimize the web content for the end user right before the webserver delivers the web content towards the browser. In other instances, the optimization may occur at the request of the computing device.

In some embodiments, context analysis system 115 can apply optimization based on an independent context expression evaluation (as well as that suggested by the content). For example, the context analysis system 115 may filter out new HTML functionality that is not supported for a given device, minimization of java script, or the use of a cached compilation of Less Cascade Style Sheets (CSS) or a software as a service (SaaS) implementation.

As mentioned above, the context analysis system 115 may allow for the tendering of web content based on a context segmentation path. The context analysis system 115 may also provide an encapsulated rendering of web content in the form of a widget. For example, a map widget may include an encapsulation of context segments. When a computing device that is capable of using gestures requests use of the map widget, the map widget may provide a map UI that allows for gesture-based interactions. Conversely, when a computing device having limited capabilities requests use of the map widget, the map widget may provide a basic map UI that includes a legend or other descriptive information that would normally be obtained from interacting with the map using gestures or interactions.

The context analysis system 115 may encapsulate context rules within individual widgets in a way that is separate and distinct from how the web page that includes the widget is rendered. Thus, the rendering of one instance of web content for a web page does not directly affect how other web content or objects of the same web page are rendered, allowing for increased decoupling, increased reusability, and simpler quality control. Indeed, context-specific customization for individual widgets or objects can be modified with no regression risk to rendering for other contexts or end users.

In other instances, rendering for one context segment can extend the rendering for a fallback context segment. For example, a specific rendering for an iPhone can extend to a general smartphone context segment.

In some embodiments, the context analysis system 115 may publish for wider consumption, a contextual vocabulary for a website 140, which may be included in a suite or group of websites. In some instances, the context analysis system 115 publishes the complete context vocabulary for all other sub-systems to view. Exemplary sub-systems may include other related websites, web content management systems, or web content distribution systems—just to name a few.

Figure 2:
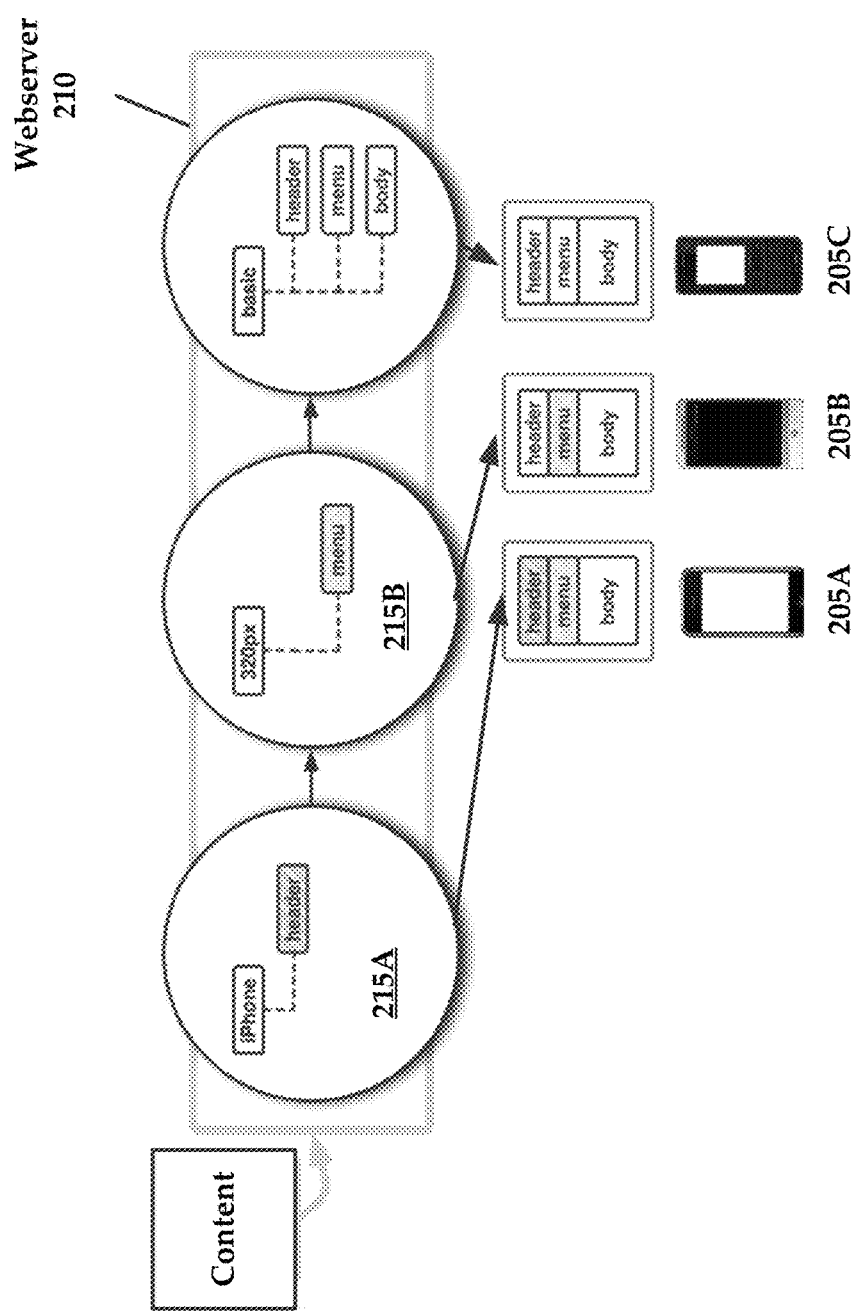
FIG. 2 illustrates a process where a context analysis system delivers different web content to each of a plurality of computing devices based upon device capabilities.

FIG. 2 illustrates a process where the context analysis system 115 delivers different web content to each of a plurality of computing devices 205A-C based upon device capabilities. With regard to computing device 205A which includes an iPhone device, a webserver 210 tailors content for an iPhone device. As described above, the iPhone contextual segment may be granular, where many versions of the iPhone are included in the general iPhone contextual segment. For example, unique models of the iPhone are associated with specific device capabilities that encompass display size and resolution, as well as other device capabilities. In response to this information, the context analysis system 115 tailors header and menu portions of web content 215A in an optimal manner. For example, the menu may include a gesture activated menu that is optimized for an iPhone.

The computing device 205B is determined by the context analysis system 115 to belong to a contextual segment of 320 pixel display devices. The context analysis system 115 may tailor the menu of the web content 215B to include a resolution that is rendered optimally by a 320 pixel capable computing device.

The computing device 205C is determined by the context analysis system 115 to belong to a contextual segment of basic display devices, which may include devices with lower resolution displays or devices that have small display screens. The context analysis system 115 may generate a header, menu, and body that are of low resolution and limited complexity with regard to content type. Indeed, the context analysis system 115 may predominantly utilize textual content or a single image that includes textual content.

Regardless of how the web content is formatted in each of the above scenarios, the same informational content may be displayed to each end user, albeit using different types of web content.

Conversely, while FIG. 2 illustrates the optimization of web content based upon device context, the context analysis system 115 may also tailor the web content based upon the contextual segments known for the end user.

In some embodiments, the context analysis system 115 may determine a customer segmentation for an end user based upon contextual information determined for the end user. In other embodiments the context analysis system 115 may also determine a customer segmentation of an end user based upon device related information determined from the computing device used by the end user. In yet other instances, the context analysis system 115 may determine a customer segmentation of an end user based upon both contextual information determined for the end user and device related information determined from the computing device used by the end user. It will be understood that while a contextual segment includes one or more parameters/attributes of an end user such as "under 30" or "college educated", a customer segmentation may include a broader categorization of the end user. Indeed, a customer segmentation may include a collection of contextual segments that define a category such as "affluent consumer", "technology aficionado", "world traveler" or other similar categories. For example, an end user that searches for high priced travel services and is determined to use a brand new and costly smartphone may be assigned a customer segmentation of "affluent consumer". In another example, it may be possible to infer a customer segmentation from only device related information for the end user. For example, if the end user is known to purchase a new laptop the same week a new laptop comes onto the market, the context analysis system 115 may assign the end user with a customer segmentation of "early technology adopter". Many other examples of customer segmentation would be apparent to one of ordinary skill in the art.

Figure 3:
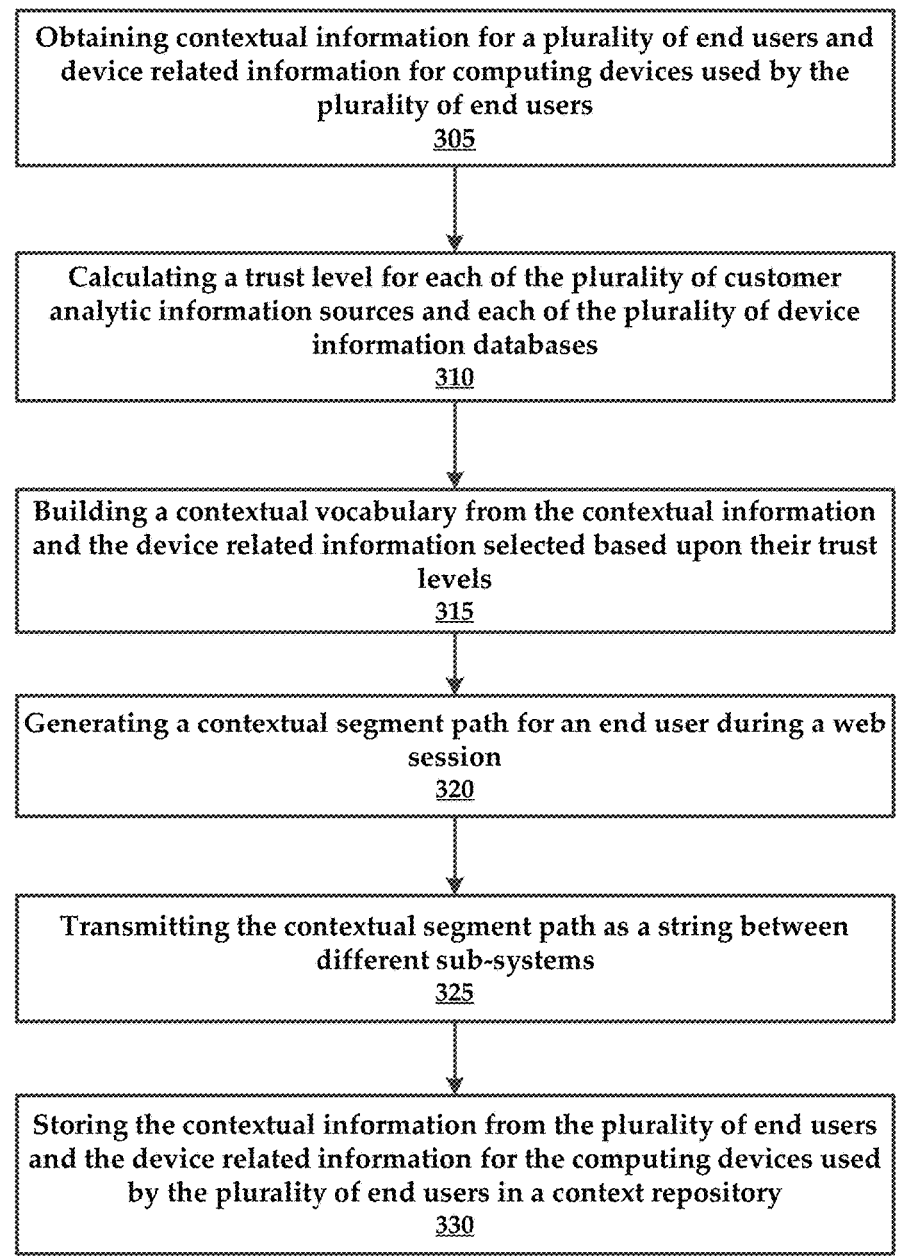
FIG. 3 is a flowchart of a method for building contextual properties in accordance with a contextual vocabulary.

FIG. 3 is a flowchart of an exemplary method for building a contextual vocabulary using a contextual analysis system comprising a processor and a memory for storing logic. According to some embodiments, the method includes obtaining 305 contextual information for a plurality of end users and device related information for computing devices used by the plurality of end users.

In some instances, the contextual information is obtained from a plurality of customer analytic information sources and the device related information being obtained from a plurality of device information databases. Again, consumer analytics may be obtained from end user profiles, web analytics, or other similar information sources that provide information that is indicative of the behaviors or preferences of end users (e.g., consumers). Device related information can be obtained from many different resources such as product databases, websites, device testing, and similar other similar resources such as ambient data sources described above.

After obtaining the various customer and device analytics, the method includes calculating 310 a trust level for each of the plurality of customer analytic information sources and each of the plurality of device information databases. The trust level for an information source is indicative of the veracity or reliability of the information source. In some instances, the trustworthiness of a source may be inferred from the authoritativeness of a source. For example, if device capabilities are located directly from the device manufacturer, the information can be considered as highly trustworthy.

Advantageously, the method relies on trustworthy information sources when available. Conflicts between information sources may be resolved by a determination of trust levels for each of the information sources. The most trustworthy source is selected for use.

Next, the method includes building 315 a contextual vocabulary from the contextual information and the device related information selected based upon their trust levels. As mentioned above, the contextual vocabulary defines capabilities of the computing devices and preferences of the end users. The contextual vocabulary may be used to dynamically format web content for a web page.

In some embodiments, the method includes generating 320 a contextual segment path for an end user during a web session. The contextual segment path includes contextual segments determined from consumer analytics and device related information for the computing device utilized by the end user. The contextual segment path may be embodied as a string that is easily serialized or deserialized. The use of a string allows the contextual segment path to be cached and stored efficiently within a webserver or other computing device.

Thus, the method may include transmitting 325 the contextual segment path as a string between different sub-systems. In some embodiments, the method may also include storing 330 the contextual information from the plurality of end users and the device related information for the computing devices used by the plurality of end users in a context repository.

Figure 4:
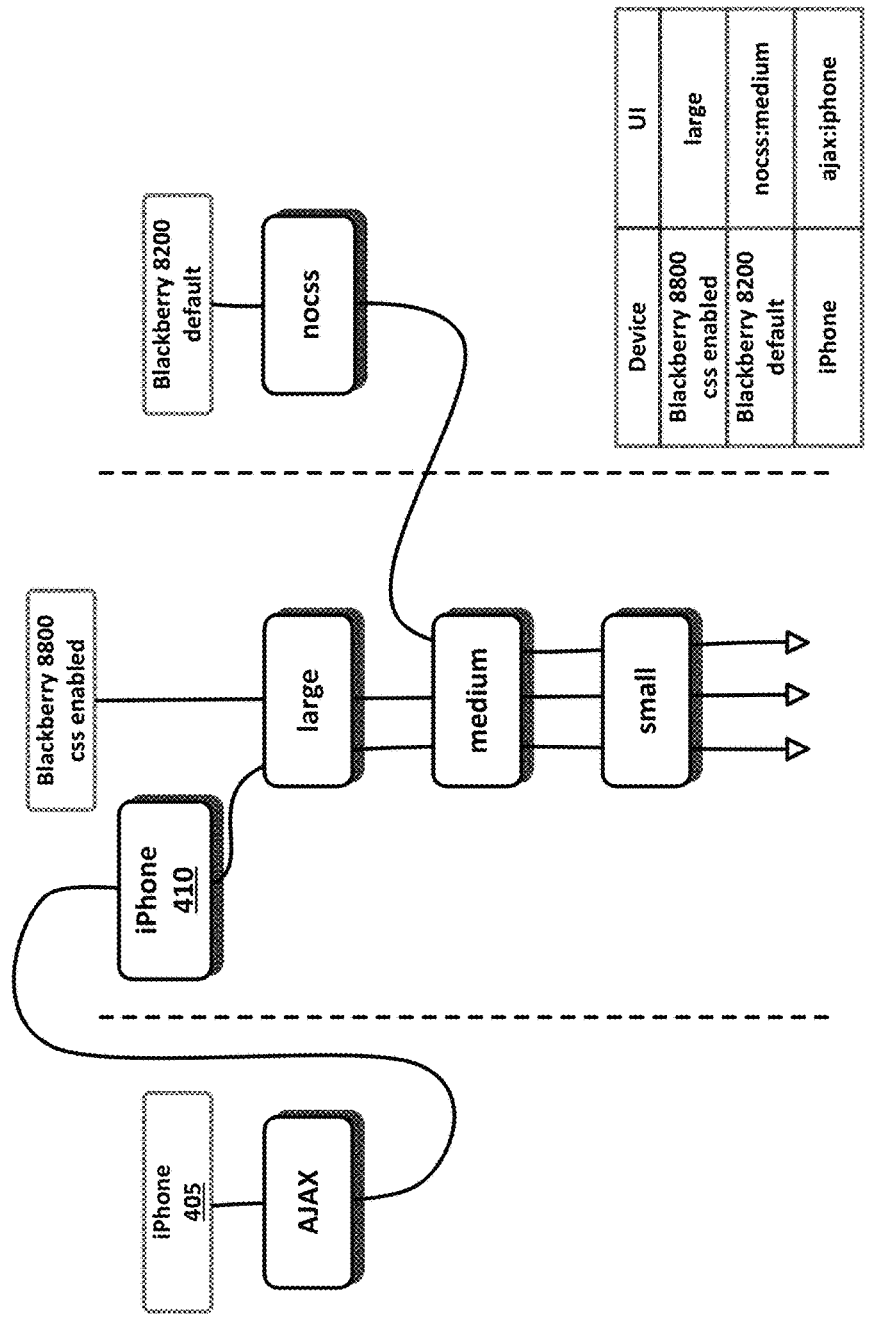
FIG. 4 illustrates a process of multiple user interface inheritance.

FIG. 4 illustrates a process of multiple inheritance of user interfaces UI. Generally, device related information regarding an iPhone 405, such as AJAX capabilities is known by the context analysis system 115. The UI for this device may be inherited to another iPhone 410, which can in turn be inherited to a Blackberry 8800 device that is cascading style sheet (CSS) enabled, allowing for large, medium, and small UI displays. Alternatively, a Blackberry 8200 device which is not CSS enabled is provided with a medium scale UI.

In general, having multiple hierarchy groupings of UIs make it easy to target specialist capabilities of computing devices while reusing common standards. UI Inheritance is used to load resources, for example, to load the page rendering for a given device. New capabilities (e.g., AJAX in this example) can easily be handled by creating additional hierarchies allowing you to deliver to new capability without regression risk on existing UI rendering.

Figure 5:
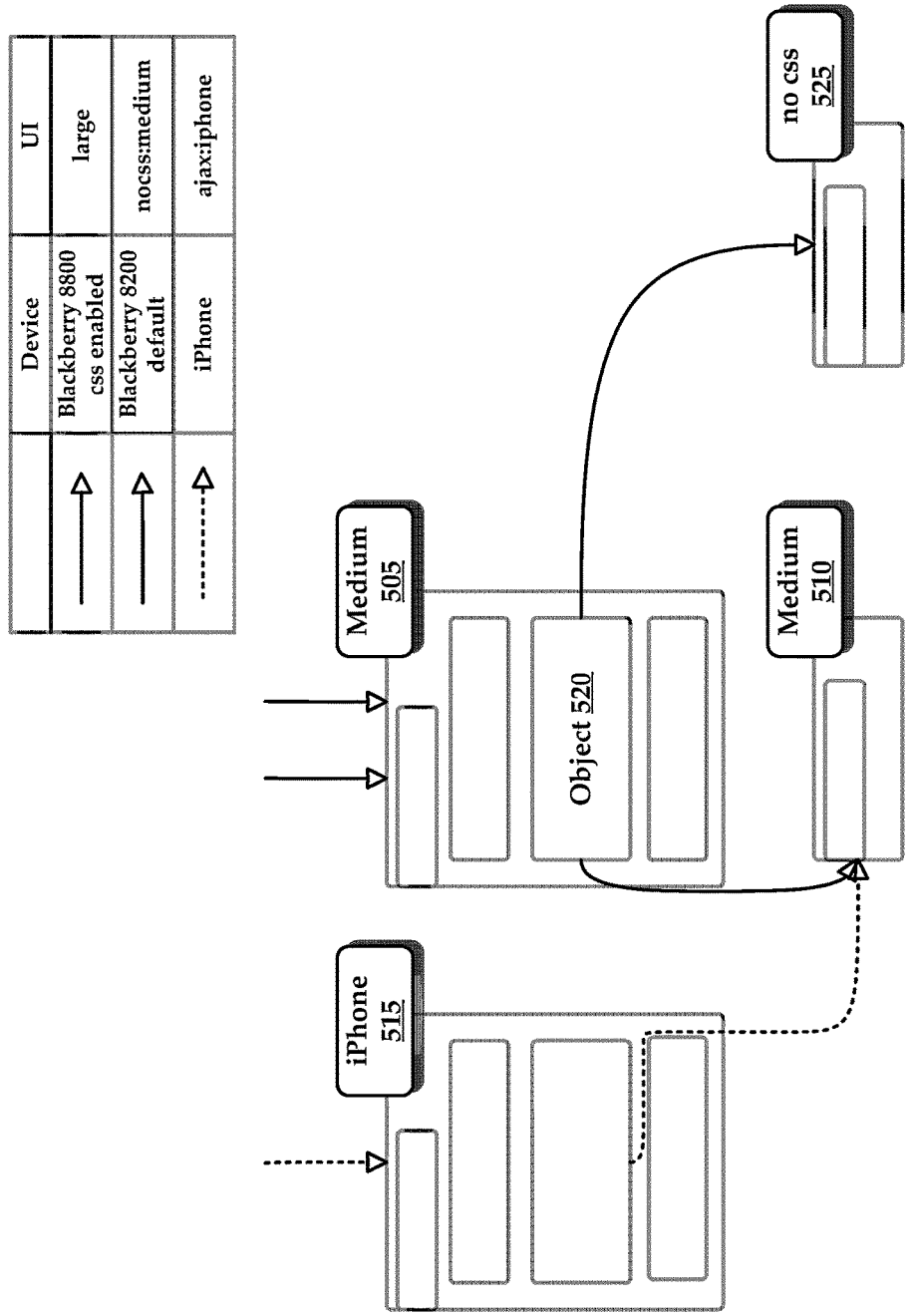
FIG. 5 illustrates a process of user interface template loading for computing devices having different capabilities and properties.

FIG. 5 illustrates a process of template loading using the present technology. Page rendering templates are loaded based on the UI hierarchy fallback path allowing you to specialize the core building blocks when desired for a given device group. For example, an object 520 that is present in a medium UI template 505 may be inherited directly to a medium UI display 510. This object may also be inherited from an iPhone template 515. The object can also be inherited to a display UI 525 that is provided to devices that are not CSS enabled.

Figure 6:
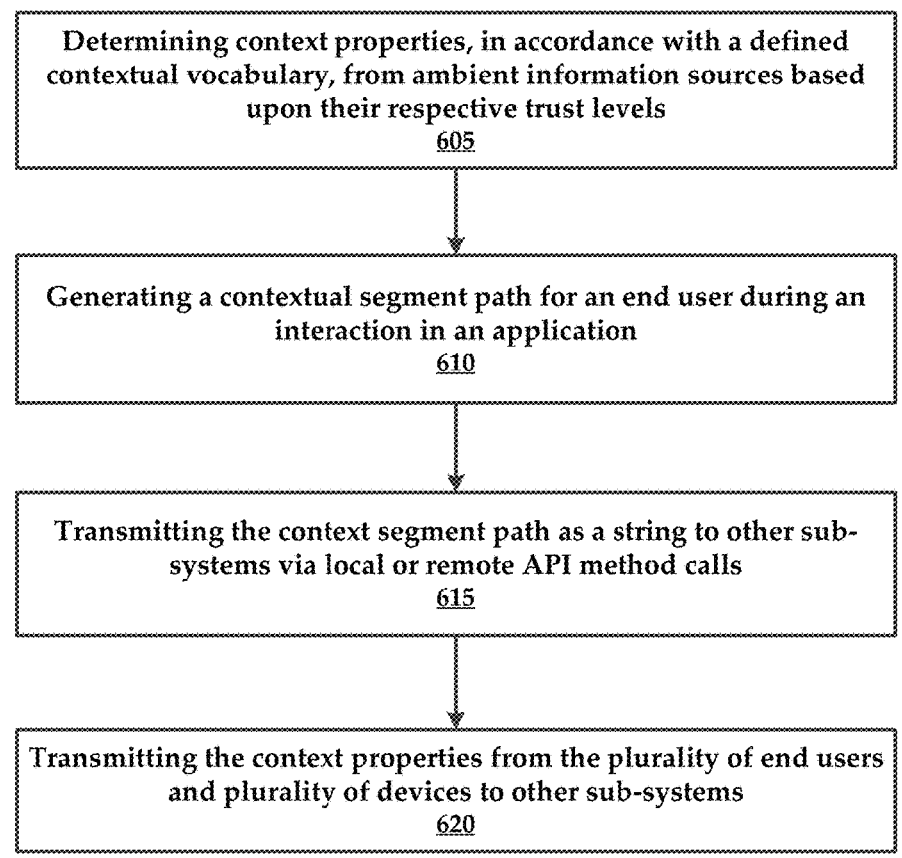
FIG. 6 is a flowchart of another exemplary method for building contextual properties in accordance with a contextual vocabulary.

FIG. 6 is a flowchart of an exemplary method for building contextual properties in accordance with a contextual vocabulary. Generally, the method includes determining 605 context properties, in accordance with a defined contextual vocabulary, from ambient information sources based upon their respective trust levels. As mentioned above, the ambient data sources include, for example, social networks, websites, blogs, as well as other similar data sources.

Next, the method includes generating 610 a contextual segment path for an end user during an interaction in an application, such as website or web-based application. Also, the method includes transmitting 615 the context segment path as a string to other sub-systems via local or remote API method calls. Other sub-systems may include related websites or applications that may provide content to the end user. In some embodiments, the method includes transmitting 620 the context properties from the plurality of end users and plurality of devices to other sub-systems.

Figure 7:
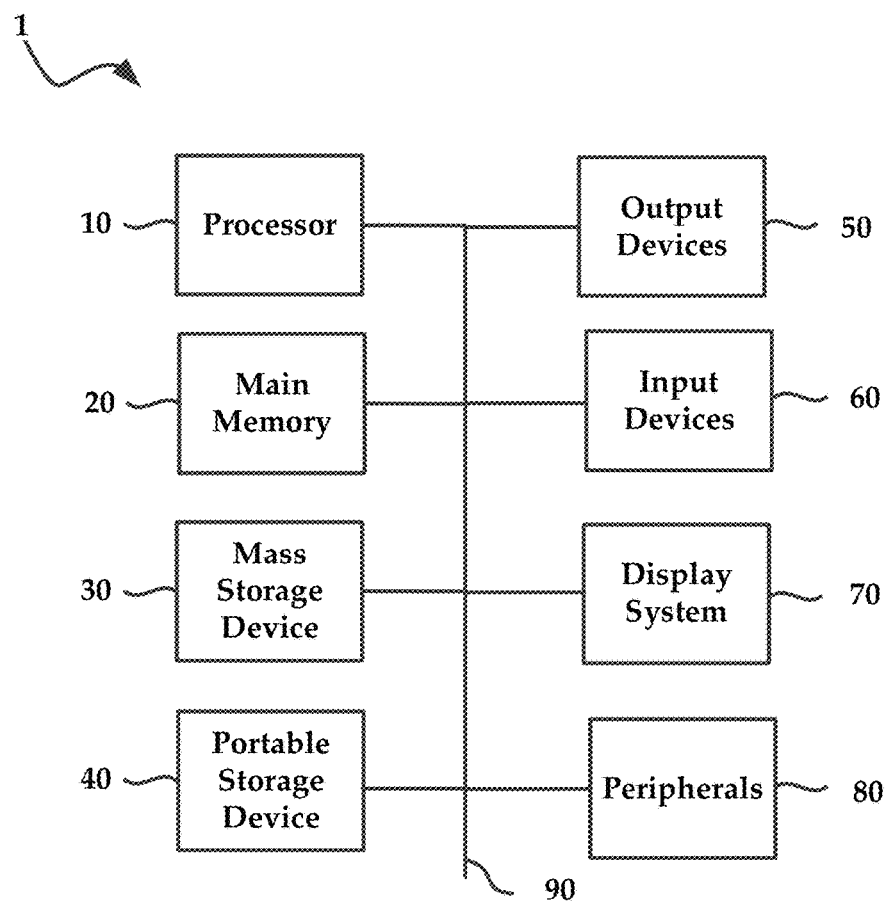
FIG. 7 illustrates an exemplary computing system that may be used to implement embodiments according to the present technology.

FIG. 7 illustrates an exemplary computing device 1 that may be used to implement an embodiment of the present systems and methods. The system 1 of FIG. 7 may be implemented in the contexts of the likes of computing devices, radios, terminals, networks, servers, or combinations thereof. The computing device 1 of FIG. 7 includes a processor 10 and main memory 20. Main memory 20 stores, in part, instructions and data for execution by processor 10. Main memory 20 may store the executable code when in operation. The system 1 of FIG. 7 further includes a mass storage device 30, portable storage device 40, output devices 50, user input devices 60, a display system 70, and peripherals 80.

The components shown in FIG. 7 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 7. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 7 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 7 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus.

Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for building contextual properties in accordance with a contextual vocabulary using a contextual analysis system comprising a processor and a memory for storing logic, the processor executing the logic to perform the method, comprising:

obtaining both contextual information and device related information for a plurality of end users using a plurality of computing devices, the contextual information being obtained for the plurality of end users and the device related information being obtained for the plurality of computing devices being used by the plurality of end users, the contextual information being obtained from a plurality of contextual information sources including customer analytic information sources, the device related information being obtained from a plurality of device information databases for the plurality of computing devices used by the plurality of end users, the contextual information defining a provider of the information;

calculating a trust level for each of the information sources, the information sources including the plurality of contextual information sources and the plurality of device information databases for the plurality of computing devices used by the plurality of end users;

resolving conflicts between information sources by selecting the most trustworthy source based upon the calculated trust levels;

building contextual properties in accordance with a contextual vocabulary from both the contextual information and the device related information for the plurality of computing devices used by the plurality of end users, the contextual information and the device related information selected based upon trust levels calculated for the contextual information and each of the plurality of device information databases, the contextual vocabulary including an aggregation of trusted information defining properties of both the end users and the computing devices being used by the end users, the trusted information gathered from the selected information sources;

generating a plurality of context segment paths for the plurality of end users from context segments determined from the contextual properties, the context segments arranged as a hierarchical representation of device related information and contextual information, each context segment path being a string that uniquely defines context segment allocation for a given context, the context segment allocation identifying resources for web content;

selecting a context segment path by comparing customer analytic information of the end user and device related information for the computing device of the end user to a plurality of context segment paths created from the contextual vocabulary;

minimizing a serialized version of a context segment path by removing redundant implied context segments from a hierarchical representation that defines an order of the context segment path that is traversed to find a resource; and dynamically formatting web content for a web page using the contextual properties.

2. The method according to claim 1, wherein the string is a cache key that is capable of being serialized and de-serialized.

3. The method according to claim 1, wherein calculating a trust level for each of the information sources comprises selecting from contextual repositories such as a device information database, the trust level being indicative of a veracity or accuracy of the device information database.

4. The method according to claim 1, wherein the contextual properties in accordance with the contextual vocabulary is comprised of a plurality of parameters that each represent context related information having a highest trust level chosen from a plurality of similar device information databases.

5. The method according to claim 1, further comprising determining a customer segmentation for an end user based upon the plurality of contextual information sources, the customer segmentation being used as a filter for tailoring delivery of content to the end user by a webserver.

6. The method according to claim 1, further comprising storing the contextual information from the plurality of end users and the device related information for the plurality of computing devices used by the plurality of end users in a context repository.

7. A system for building a contextual vocabulary, the system comprising:
- a processor; and
- a memory for storing logic that when executed by the processor causes the system to:
  - obtain contextual information for a plurality of end users and device related information for computing devices used by the plurality of end users, the contextual information being obtained from a plurality of contextual information sources including customer analytic information sources, the device related information being obtained from a plurality of device information databases;
  - calculate a trust level for each of a plurality of contextual properties;
  - build contextual properties in accordance with the contextual vocabulary from the contextual information and the device related information selected based upon their trust levels, the contextual vocabulary defining properties of the computing devices and of the plurality of end users, the contextual properties being utilized to dynamically format web content for a web page;
  - generate a context segment path for an end user from context segments of the contextual vocabulary determined from the contextual properties, the context segment path being a string that uniquely defines context segment allocation for a given context, the context segment allocation identifying resources for the web content;
  - select context segments for the context segment path by comparing customer analytic information of the end user and device related information for the computing device of the end user to a plurality of the context segment paths from the contextual vocabulary;
  - arrange the context segments as a hierarchical representation of device related information and contextual information; and
  - minimize a serialized version of the context segment path by removing redundant implied context segments from a hierarchical representation that defines an order of the context segment path that is traversed to find a resource.

8. The system according to claim 7, wherein a context segment arranged as a hierarchical representation that has multiple inheritances, includes an ordering of the context segments to optimize discovery of resources for the web content.

9. The system according to claim 7, wherein the string is a cache key that is capable of being serialized and de-serialized.

10. The system according to claim 7, wherein the calculation of the trust level for each of the plurality of contextual information sources comprises selecting from contextual repositories such as a device information database, the trust level being indicative of a veracity or accuracy of the device information database.

11. The system according to claim 7, wherein the contextual properties in accordance with the contextual vocabulary is comprised of a plurality of parameters that each represent context related information having a highest trust level chosen from a plurality of similar device information databases.

12. The system according to claim 7, wherein the processor further executes the logic to determine a customer segmentation for an end user based upon the plurality of contextual information sources, the customer segmentation being used as a filter for tailoring delivery of content to the end user by a webserver.

13. The system according to claim 7, wherein the processor further executes the logic to store the contextual information from the plurality of end users and the device related information for the computing devices used by the plurality of end users in a context repository.

14. A method for building contextual properties in accordance with a contextual vocabulary using a contextual analysis system comprising a processor and a memory for storing logic, the processor executing the logic to perform the method, comprising:
- determining context properties, in accordance with a defined contextual vocabulary, from ambient information sources that include information observed from continuous interactions between a plurality of users and a plurality of web content and applications, along with interactions between the plurality of users and a plurality of devices that the users use, the context property determination based upon respective trust levels of the ambient information sources;
- generating a contextual segment path comprising an ordered list of segments for an end user during an interaction of the end user in an application, the contextual segment path generated from a multiple hierarchical representation of ordered context segments and arranged as a hierarchical representation of device related information and contextual information;
- selecting a context segment for the context segment path by comparing customer analytic information of the end user and device related information for the computing device of the end user to a plurality of context segment paths from the contextual vocabulary;
- minimizing a serialized version of the context segment path by removing redundant implied context segments from a hierarchical representation that defines an order of the context segment path that is traversed to find a resource;
- transmitting the generated context segment path as a string to a plurality of other sub-systems via local or remote API method calls, the string uniquely defining context segment allocation for a given context, the context segment allocation identifying resources for the web content; and
- transmitting the determined context properties from the plurality of users and the plurality of devices to the plurality of other sub-systems.

* * * * *